US007919933B2

United States Patent

(12) United States Patent
Philiben et al.

(10) Patent No.: US 7,919,933 B2
(45) Date of Patent: Apr. 5, 2011

(54) HIGH INTENSITY DISCHARGE STROBE LIGHT

(75) Inventors: Scott Thomas Philiben, Bend, OR (US); Christian Auerswald, Pohle (DE); Elon Alexandria, Bend, OR (US)

(73) Assignee: Precise Flight, Inc., Bend, OR (US)

( * ) Notice: Subject to any disclaimer, the term of this patent is extended or adjusted under 35 U.S.C. 154(b) by 388 days.

(21) Appl. No.: 12/157,374

(22) Filed: Jun. 9, 2008

(65) Prior Publication Data

US 2009/0256488 A1 Oct. 15, 2009

Related U.S. Application Data

(60) Provisional application No. 61/124,305, filed on Apr. 15, 2008.

(51) Int. Cl.
*H05B 37/02* (2006.01)
*H02M 3/335* (2006.01)

(52) U.S. Cl. ................. 315/291; 315/241 S; 363/21.01; 363/63

(58) Field of Classification Search .............. 315/200 R, 315/209 R, 225, 241 S, 194, 291, 307, DIG. 4; 363/7, 17, 19, 63, 21.01, 74, 98
See application file for complete search history.

(56) References Cited

U.S. PATENT DOCUMENTS 3,836,797 A * 9/1974 Steen ............................ 327/172
5,434,479 A * 7/1995 Ohnishi et al. ............ 315/209 R
5,932,976 A * 8/1999 Maheshwari et al. ........ 315/291
6,501,231 B1 12/2002 Hyland et al.
6,633,138 B2 * 10/2003 Shannon et al. .............. 315/224
7,030,573 B2 4/2006 Powell
7,420,333 B1 * 9/2008 Hamdad et al. ............... 315/224
2004/0183472 A1 9/2004 Kamoi et al.

OTHER PUBLICATIONS

Metal Halide Lamps Photo Optics, 2000, 84 pages, OSRAM SYLVANIA Inc., Danvers, MA.

* cited by examiner

*Primary Examiner* — Jacob Y Choi
*Assistant Examiner* — Jimmy T Vu
(74) *Attorney, Agent, or Firm* — Chernoff, Vilhauer, McClung & Stenzel, LLP

(57) ABSTRACT

A high intensity discharge (HID) lamp is operable as a stroboscopic light source by reducing power and maintaining constant polarity at the lamp for a period of dimmed operation and exciting the lamp with aperiodic polarity reversals for a run up period before returning the lamp to steady state operation.

20 Claims, 3 Drawing Sheets

HIGH INTENSITY DISCHARGE STROBE LIGHT

CROSS-REFERENCE TO RELATED APPLICATIONS

This application claims the benefit of U.S. Provisional Application No. 61/124,305, filed Apr. 15, 2008.

BACKGROUND OF THE INVENTION

The present invention relates to high intensity discharge (HID) lamps and, more particularly, to an HID strobe lamp and a method for operating an HID strobe lamp.

Light is produced by high intensity discharge (HID) lamps when an electric current arcs between two closely spaced electrodes in a sealed quartz-glass or ceramic capsule, known as a discharge tube, arc tube or burner, containing a vapor of metal and gas. Free electrons in the arc collide with the metal atoms in the vapor exciting electrons of the metal atoms to a higher energy state. When the excited electrons return to their original, lower, energy level, electromagnetic radiation is emitted having a wavelength determined by the energy level of the electrons and the constituency of the vapor in the capsule. Compared to a filament-type halogen lamp, HID lighting typically produces light more efficiently and with a color temperature more closely approximating that of sunlight. As a result, HID lighting has been adapted to many residential and commercial uses, including building, street and sports arena lighting, automotive lighting and aviation lighting. Despite the advantages of HID lighting, the operating characteristics of HID lamps detract from the usefulness of the lamps as stroboscopic light sources.

Unlike an incandescent lamp, an HID lamp does not immediately illuminate when the power is supplied to the lamp. When a voltage is applied to the electrodes of an HID lamp, there is an initial delay while the gas is heated during which the lamp acts as an open circuit. Following the initial delay, the gas in the discharge tube is ionized with a high voltage pulse, commonly 2-20 kilovolts (kV), enabling the ionized gas to conduct a relatively high current between the lamp's electrodes and producing a glow discharge. Following initiation of the glow discharge, the lamp requires a relatively high current for a short period of time to sustain the current flow between the electrodes as the electrodes begin to warm-up. The electrodes must be warmed up so that they can supply sufficient numbers of electrons to sustain an arc and, if the warm-up period is not adequate, the lamp may extinguish later in the start up process. Following warm-up, a run-up phase during which the electrodes continue to heat up and the voltage applied to the lamp is increased precedes steady-state operation of the lamp. HID lamps are typically operated with an alternating current of 45-225 v and a frequency commonly in the range of 150-400 Hertz (Hz). The alternating polarity of the current reduces loss of material from the electrodes and the relatively low frequency avoids acoustic resonance which can cause the lamp to flicker, extinguish or even self-destruct. Depending upon the type of lamp and its condition, an HID lamp may require from 10 seconds to 15 minutes to reach steady state operation and full light output from a cold start.

While initiating operation of an HID lamp takes considerable time, the time required to restrike (restart) an extinguished lamp is typically longer and commonly twice as long as the cold start up interval. If an extinguished HID lamp is not allowed cool adequately before a restrike is attempted, the arc may extinguish before steady state operation can be attained. Some HID lamps have a "hot restrike" capability enabling restriking of the lamp before the lamp has cooled. Hot restriking typically requires an electrical pulse with 10 times the voltage required for a cold start of the lamp and may adversely effect the lamp's life. While, the output of an HID lamp can be dimmed by reducing the power to the lamp, reducing the power and the output of the lamp to less than about 60% of rated levels runs the risk that the lamp may extinguish requiring a restrike. As the input power to the lamp is reduced to dim the output, the discharge arc becomes unstable with each change in polarity of the alternating current producing undesirable electromagnetic interference and, if the energy flowing in the lamp is no longer sufficient to maintain the electrode temperature above the thermal electron emission temperature, the arc may extinguish. Many strobe light applications require a lamp output differential that is greater than the output differential (approximately 40%) attainable by reducing the magnitude of the power to the lamp and the lengthy restrike interval and/or high restrike voltage requirements make HID lamps generally unsuitable for use as stroboscopic light sources.

What is desired, therefore, is a system and method for operating an HID lamp that enables substantially reducing the light output of the lamp for an extended period and rapidly returning the lamp to full illumination.

DETAILED DESCRIPTION OF PREFERRED EMBODIMENTS

Figure 1:
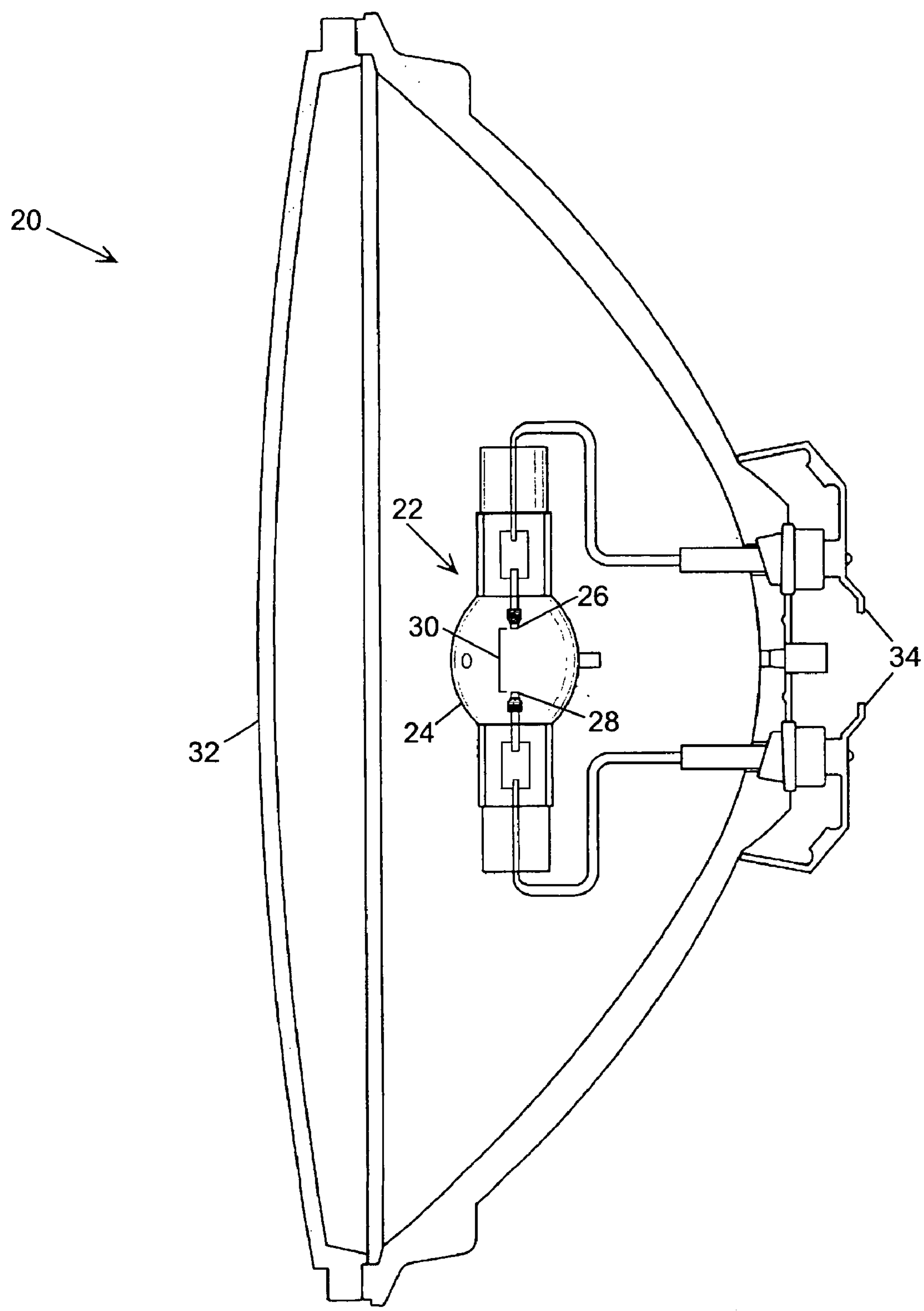
FIG. 1 is an elevation view of an exemplary high intensity discharge lamp.

Referring in detail to the drawings where similar parts are identified by like reference numerals, and, more particularly to FIG. 1, an exemplary high intensity discharge (HID) lamp 20 comprises, generally, a discharge tube 22, also known as an arc tube or burner, which is commonly mounted in an outer envelope 24. Many HID lamps produce considerable light in the ultra-violet (UV) spectrum and the outer envelope is commonly treated to control the amount of UV light in the lamp's output. The discharge tube 22 typically comprises a quartz (fused silica) or ceramic tube containing a metal and an inert gas, such as Xenon or nitrogen. For example, the discharge tube of a metal halide lamp commonly includes mercury which is liquid at room temperature and which vaporizes during operation of the lamp. The mercury atoms inhibit the arc and increase the operating voltage of the lamp. In addition, a metal halide lamp typically includes a rare earth metal such as thulium or holmium which controls the spectrum of the light emitted by the lamp and a halogen, typically an iodide or a bromide, which combines with the rare earth metal to increase the density of the rare earth atoms in the discharge arc. Metal halide lamps are commonly filled with argon which has good ignition properties and which is inert and will not combine with the other materials in the discharge tube. A pair of tungsten electrodes 26, 28 protrude into the interior of the discharge tube. The ends of the electrodes are spaced apart creating an arc gap 30 (indicated by a bracket). The discharge tube assembly may be, but often is not, enclosed in an outer enclosure 32 that may include mirrored reflector portions to focus the light output of the lamp. Electrical connectors 34, often comprising cables, enable detachable connection of the lamp to a ballast circuit which supplies power to the electrodes.

Light is produced by an HID lamp when an electric current arcs between the closely spaced electrodes 26, 28 in the discharge tube. Free electrons in the arc collide with atoms of the vaporized metal in the discharge tube exciting the electrons of the metal atoms to a higher energy state. When the excited electrons return to their original, lower energy level, electromagnetic radiation is emitted having a wavelength that is determined by the energy level of the energized electrons and the constituency of the vapor in the discharge tube. An HID lamp is typically operated with an alternating current having a frequency in the range of 150-400 Hertz (Hz) and an operating voltage in the range of 45-225 v. depending on the type of lamp. The alternating polarity of the current equalizes the temperatures of the electrodes and reduces electrode material loss. The relatively low frequency of the alternating current avoids acoustic resonance in the vapor which can cause the lamp to flicker, extinguish or even self destruct.

Figure 2:
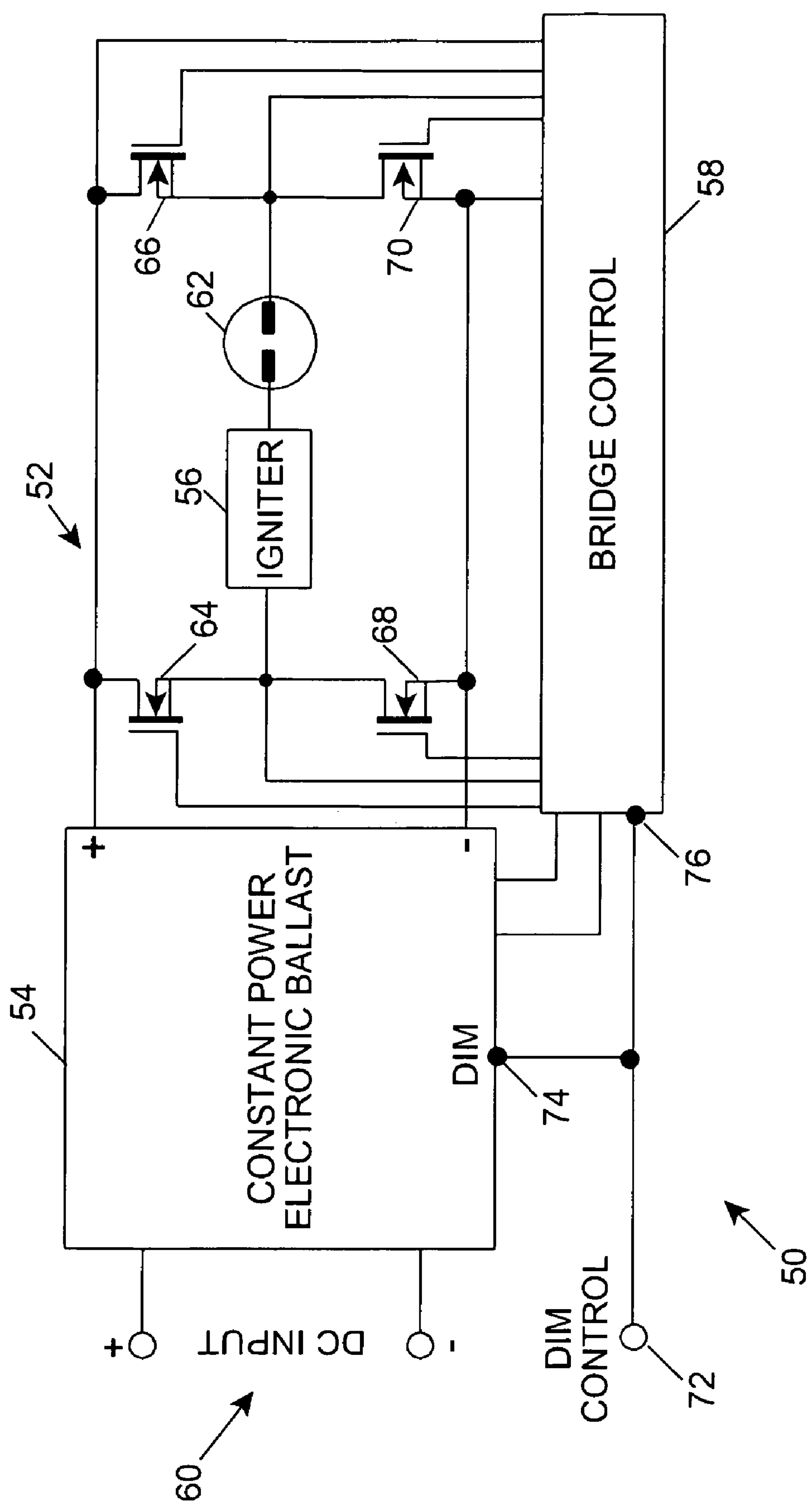
FIG. 2 is a schematic illustration of an electronic ballast and control system for an HID strobe light.

Referring to FIG. 2, power for the HID lamp 62 of the HID-strobe light 50 is provided by a ballast circuit. While the ballast circuit may comprise a choke connected to an alternating current (ac) source, the ballast circuit 52 of the HID strobe light 50 comprises, generally, a constant power electronic ballast 54, an igniter 56, a bridge rectifier and a bridge controller 58. The ballast circuit converts a direct current (dc) input 60 to an alternating current of the correct frequency and voltage for operating the particular HID lamp. The dc input to the electronic ballast can be supplied by a battery or other dc source or may be supplied by a rectifier connected to an ac source. The electronic ballast steps up the dc input voltage to the lamp's operating voltage, typically 45-225 v. and controls the magnitude of current flowing to the lamp. HID lamps typically exhibit a negative resistance characteristic. When power is initially supplied to the lamp, the lamp acts like an open circuit because the gas in the discharge tube is an effective electrical insulator, but as the material in the discharge tube is heated, the resistance drops significantly, first as the gas is ionized and then as the discharge arc is established. To protect the lamp, the electronic ballast 54 includes a current limiter that limits the flow of current to the lamp as the resistance changes. The constant power electronic ballast 54 is controllable to supply differing magnitudes of power to the lamp to enable different levels of illumination. Within the differing magnitudes of power, constant power is supplied to the lamp to accommodate variations in operating voltage due to lamp temperature, manufacturing tolerances, changes in lamp characteristics as the lamp ages and variations in the input voltage.

The output of the electronic ballast 54 is direct current at the proper operating voltage for the lamp 62. The bridge rectifier converts the direct current at the output of the electronic ballast to the alternating current required for steady state operation of the lamp. The bridge rectifier comprises four transistors, commonly known as the upper left transistor 64, the upper right transistor 66, the lower left transistor 68 and the lower right transistor 70. When the upper left transistor 64 and lower right transistor 70 are conducting, the power at the lamp's terminals has a first polarity. As the lamp is illustrated in FIG. 2, the left terminal of the lamp is connected to the positive output terminal of the electronic ballast and the right hand terminal of the lamp is connected to the negative terminal of the ballast when the upper left and lower right transistors are conducting. Removing the gate signal from the upper left transistor and the lower right transistor and applying a gate signal to the upper right transistor 66 and the lower left transistor 68, reverses polarity at the terminals of the lamp. The bridge controller 58 alternately triggers conduction by the diagonal pairs of the transistors in the bridge to provide a low frequency, square wave, alternating current for operating the lamp.

When a voltage is initially applied to the electrodes of an HID lamp, the gas in the discharge tube acts as an insulator and the lamp acts as an open circuit. To initiate operation, a high voltage pulse, commonly in the range of 2-20 kilovolts (kV), is applied to the lamp by an igniter 56 that is controlled by the bridge controller 58. An exemplary igniter comprises a pulse generator to generate a series of high voltage pulses usually lasting 0.5-2 seconds and a superimposing transformer that superimposes the high voltage pulses on the alternating current at the lamp's terminals. The high voltage pulses ionize the gas in the discharge tube, enabling the ionized gas to conduct a fairly high current between the electrodes of the lamp and producing a glow discharge. Following initiation of the glow discharge, a relatively high current is conducted by the lamp for a short period of time to sustain the flow of current between the electrodes until the electrodes can warm-up enabling them to supply sufficient numbers of electrons to sustain an arc. If the warm-up period is not adequate, the lamp may extinguish later in the start up process. Following warm-up, the lamp undergoes a run-up phase during which the electrodes continue to heat up and the voltage applied to the lamp is steadily increased leading to steady state operation of the lamp. Depending on the type of lamp and the lamp's condition, an HID lamp may require between 10 seconds and 15 minutes to reach full output from a cold start. Typically, metal halide lamps reach approximately 80% of full output within 3 minutes after ignition.

HID lamps are sometimes operated at up to 110% of rated power and can be dimmed by reducing the power supplied to the lamp. However, operating an HID lamp at less approximately 60% of rated power can cause the arc to become unstable when the polarity reverses producing undesirable electromagnetic interference and, if there is insufficient energy flowing to the lamp to maintain an electrode temperature greater than the thermal electron emission temperature, the arc may extinguish. If the arc extinguishes, it may be necessary to allow the electrodes cool before restriking the lamp. Restriking a hot lamp commonly requires twice as much time as is required to start the lamp from a cold start. Some HID lamps are designed for "hot restrike" enabling the lamp to be reignited before the electrodes cool. However, a hot restrike typically requires an ignition pulse having approximately 10 times the voltage of the ignition pulse needed for a cold start and hot restriking can adversely effect the life of the lamp.

The limited differential in light output attainable by reducing the electrical power to the lamp, the lengthy period required to restrike a typical HID lamp and the detrimental effect on lamp life of hot restrikes significantly detracts from the usefulness of HID lamps as strobe lights which must be repeatedly substantially dimmed or extinguished and returned to full output. However, the present inventors were surprised to discover that the output of an HID lamp can be substantially reduced for an extended period and the lamp rapidly returned to full output if power of consistent polarity and approximately 30% of rated power is applied to the lamp's input during the interval that the output is dimmed and followed by exciting the lamp with aperiodic pulses of power for a run up interval before resuming steady state operation.

Figure 3:
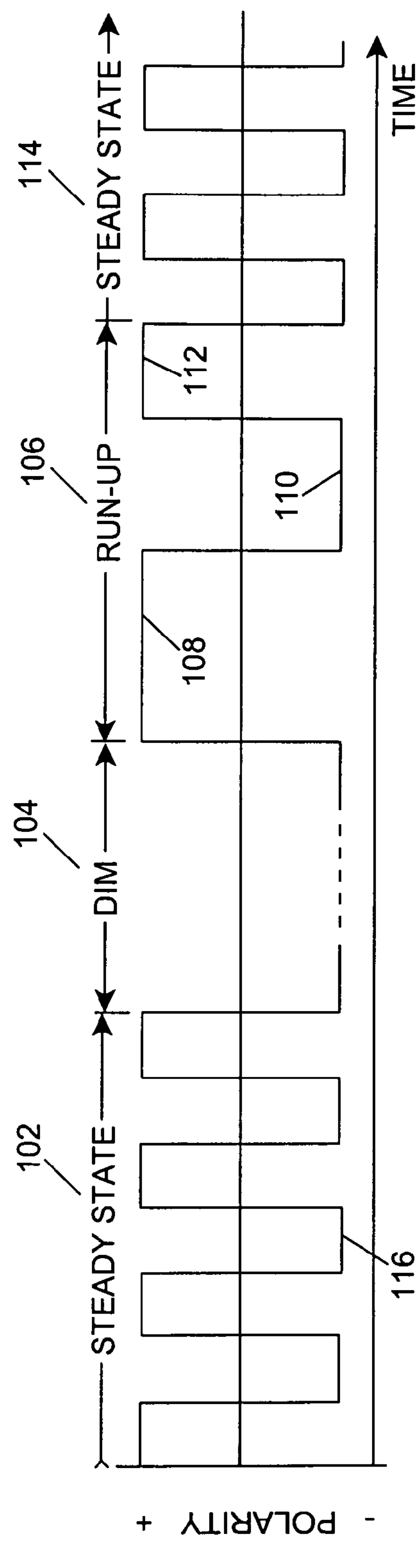
FIG. 3 is a graphical representation of the polarity of electrical power during an operating interval of the HID strobe light.
Figure 4:
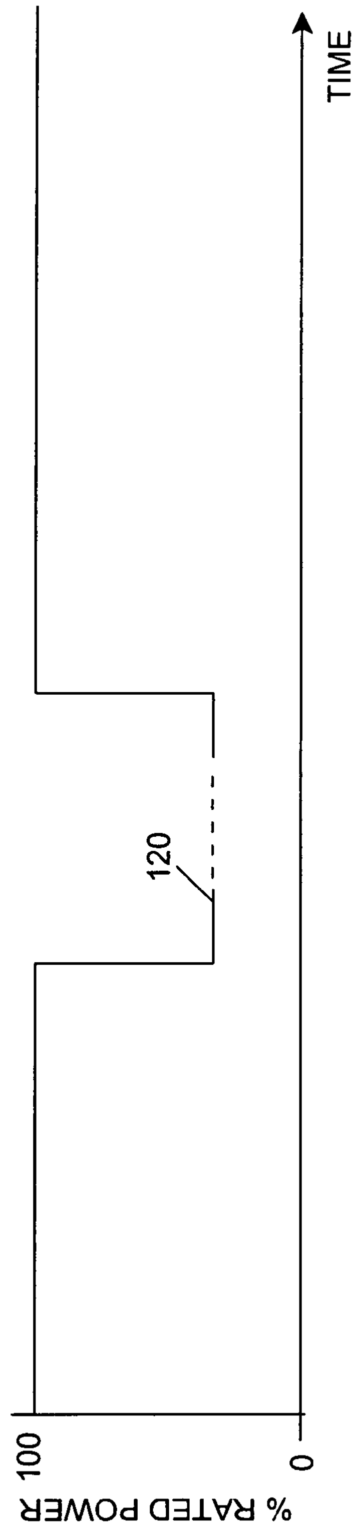
FIG. 4 is a graphic representation of input power during the operating interval illustrated in FIG. 3.

Referring to FIG. 3, during steady state operation 102, the HID lamp 62 of the strobe light system 50 is typically excited with a 45-225 v. alternating current that reverses polarity at a frequency between 150 Hz and 400 Hz. While FIG. 3, illustrates the lamp as operating at full rated power and producing full light output during steady state operation, HID lamps are sometimes operated with up to 110% of full power or they may be dimmed by reducing power to the lamp. However, the power typically cannot be reduced to less than about 60% of rated power without risking arc instability and extinguishment. In the strobe lamp system 50, the lamp is dimmed when a dimming signal is applied at a dimming terminal 72 which is connected to appropriate control inputs 74, 76 of the electronic ballast 64 and the bridge controller 58, respectively. The presence of the signal at the dimming terminal causes the output of the electronic ballast to be reduced to less than 50% of rated and typically approximately 30% of rated power 120, as illustrated in FIG. 4, and causes the bridge controller 58 to cease reversing the polarity at the lamp's terminals by maintaining the gate signals at a diagonal pair of transistors 64, 70 or 66, 68. By maintaining consistent polarity and approximately 30% of rated power at the lamp's terminals during the dim interval 104, the temperature of one of the electrodes can be maintained above the thermal electron emission temperature avoiding unstable lamp operation and the lamp's output will be reduced to the level of the glow discharge, a small fraction of the full light output of the lamp.

To return the lamp to steady state operation, the dimming signal is removed from the dimming terminal 72 signaling the ballast to resume supplying full power at its output while signaling the bridge controller to initiate a run up operation comprising a plurality of aperiodic reversals of the polarity of the power at the lamp's terminals. At the end of the dimmed interval 104, the bridge controller reverses the polarity of the power to the lamp and then repeatedly reverses the polarity at decreasing intervals for a run up interval 106. The period of each subsequent reversal during the run-up interval is shorter than the previous period. For example, after the first reversal of polarity, the polarity of the input power might be maintained for a time 108 approximately equal to three steady state power reversal intervals 116, followed by a polarity reversal lasting a period 110 equal to approximately two steady state polarity reversal periods and a third reversal interval 112 lasting approximately 1.5 steady state polarity reversal periods before the lamp resumes steady state operation 108 with periodically alternating polarity at the steady state periodicity (approximately 2 milliseconds-7 milliseconds). As a result, the output of the HID lamp can be substantially reduced for an extended period of time and quickly returned to steady state operation at full output in anticipation of the next cycle of dimming.

The HID strobe light provides the efficiency and spectral advantages of discharge lighting in a strobe light and enables the output of a high intensity discharge lamp to be substantially reduced and rapidly returned to full output without restriking the lamp.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A method of varying illumination of a high intensity discharge lamp, said method comprising the steps of:
(a) periodically reversing a polarity of electric power to said lamp for a first interval;
(b) following said first interval, reducing said electric power to said lamp and maintaining a consistent polarity of said reduced electric power for an interval of dimmed output of said lamp;
(c) following said interval of dimmed output, increasing said electric power to said lamp and aperiodically reversing polarity of said increased power; and
(d) following a plurality of said aperiodic reversals of said power, periodically reversing said power to said lamp for another interval.

2. The method of varying illumination of a high intensity discharge lamp of claim 1 wherein a frequency of said periodic reversal of power polarity during at least one of said first interval and said another interval is greater than 150 reversals per second and less than 400 reversals per second.

3. The method of varying illumination of a high intensity discharge lamp of claim 1 wherein a frequency of said periodic reversal of power polarity during at least one of said first interval and said another interval is greater than 100 reversals per second and less than 500 reversals per second.

4. The method of varying illumination of a high intensity discharge lamp of claim 1 wherein said reduced electric power comprises a magnitude of electric power approximating thirty percent of a rated power for said lamp.

5. The method of varying illumination of a high intensity discharge lamp of claim 1 wherein said reduced electric power comprises a magnitude of electric power less than fifty percent of a rated power for said lamp.

6. The method of varying illumination of a high intensity discharge lamp of claim 1, wherein the step of increasing said power and aperiodically reversing polarity of said power comprises the steps of:
(a) reversing said electrical polarity and increasing said power;
(b) maintaining said polarity for a first run-up period;
(c) reversing polarity of said power and maintaining said polarity for a second run-up period; and
(d) reversing polarity of said power and maintaining said polarity for a third run-up period, wherein said first, said second and said third run-up periods are of unequal duration.

7. The method of varying illumination of a high intensity discharge lamp of claim 6, wherein:
(a) a duration of said second run-up period is less than a duration of said first run-up period; and
(b) a duration of said third run-up period is less than said duration of said second run-up period.

8. The method of varying illumination of a high intensity discharge lamp of claim 6, wherein said duration of said third run-up period is greater than a periodicity of said periodic reversal of power polarity during at least one of said first interval and said another interval.

9. The method of varying illumination of a high intensity discharge lamp of claim 1, wherein the step of increasing said power and aperiodically reversing polarity of said power comprises the steps of:

(a) reversing said polarity of said power and increasing said power;
(b) maintaining polarity at said lamp for a first run-up period approximating three periods of said periodic reversing of power;
(c) reversing and maintaining said polarity for a second run-up period approximating two periods of said periodic reversing of power; and
(e) reversing and maintaining said polarity for a third run-up period approximating one and one-half periods of said periodic reversing of power.

10. A method of varying illumination of a high intensity discharge lamp, said method comprising the steps of:
(a) periodically reversing polarity of electric power to said lamp, said electric power having a magnitude sufficient to cause said lamp to produce substantial illumination;
(b) reducing said power to said lamp and maintaining consistent polarity of said reduced power for a dimmed interval, said reduced power having insufficient magnitude to cause said lamp to produce substantial illumination;
(c) increasing said power to said lamp and reversing said polarity of said power for a first run-up period;
(d) following said first run-up period, reversing said polarity of said power for a second run-up period having a duration shorter than a duration of said first run-up period;
(e) following said second run-up period, reversing said polarity of said power for a third run-up period having a duration shorter than said duration of said second run-up period; and
(f) following said third run-up period, periodically reversing said power for another interval, said power having a magnitude to sufficient to cause said lamp to produce substantial illumination.

11. The method of varying illumination of a high intensity discharge lamp of claim 10 wherein a frequency of said periodic reversal of power polarity is greater than 150 reversals per second and less than 400 reversals per second.

12. The method of varying illumination of a high intensity discharge lamp of claim 10 wherein a frequency of said periodic reversal of power polarity is greater than 100 reversals per second and less than 500 reversals per second.

13. The method of varying illumination of a high intensity discharge lamp of claim 10 wherein said reduced power having a magnitude insufficient to produce substantial illumination comprises approximately thirty percent of a rated power for said lamp.

14. The method of varying illumination of a high intensity discharge lamp of claim 1 wherein said reduced power having a magnitude insufficient to produce substantial illumination comprises a magnitude of electric power less than fifty percent of a rated power for said lamp.

15. The method of varying illumination of a high intensity discharge lamp of claim 10, wherein said duration of said third run-up period is greater than a periodicity of said periodic reversal of power polarity.

16. The method of varying illumination of a high intensity discharge lamp of claim 10, wherein:
(a) a duration of said first run-up period is approximately equal to a duration of three periods of said periodic reversing of said power polarity;
(b) a duration of said second run-up period is approximately equal to a duration of two periods of said periodic reversing of said power polarity; and
(c) a duration of said third run-up period is approximately equal to a duration of one and one-half periods of said periodic reversing of said power polarity.

17. A strobe light comprising:
(a) a high intensity discharge lamp;
(b) a ballast capable of outputting sufficient power to cause said lamp to produce substantial illumination and including a dimming control which when activated by a dimming signal causes said ballast to output power at a magnitude insufficient to cause said lamp to produce substantial illumination, said output power comprising a direct current;
(c) a bridge conductively connected to said ballast and arranged to conduct power with a first polarity to said lamp in response to a first polarity signal and to conduct power to said lamp with a second polarity in response to a second polarity signal; and
(d) a bridge controller including an output connected to transmit said first polarity signal and said second polarity signal to said bridge and a dimming signal input connected to be activated when said dimming signal is communicated to said dimming control of said ballast, said bridge controller arranged to:
(i) alternate transmission of said first polarity signal to said bridge with transmission of said second polarity signal to said bridge, transmission of said first and said second polarity signals alternating with a steady state periodicity;
(ii) in response to a dimming signal, continuously transmit said first polarity signal to said bridge;
(iii) in response to cessation of said dimming signal,
(a) cease transmission of said first polarity signal and initiate transmission of said second polarity signal to said bridge;
(b) continue transmission of said second polarity signal for a first run-up period;
(c) discontinue transmission of said second polarity signal and transmit said first polarity signal to said bridge for a second run-up period, said second run-up period being shorter than said first run-up period;
(d) discontinue transmission of said first signal polarity signal and transmit said second polarity signal to said bridge for a third run-up period, said third run-up period being shorter than said second run-up period and longer than said steady state periodicity; and
(e) at an end of said third run-up period, resume alternate transmission of said first and said second polarity signals to said bridge at said steady state periodicity.

18. The strobe light of claim 17 wherein said steady state periodicity has a time greater than 2 milliseconds and less than 7 milliseconds.

19. The strobe light of claim 17 wherein activation of said dimming control causes said ballast to output approximately thirty percent of a rated power for said lamp.

20. The strobe light of claim 17 wherein activation of said dimming control causes said ballast to output less than fifty percent of a rated power for said lamp.

* * * * *